United States Patent [19]

Mattejat et al.

[11] Patent Number: 5,472,801
[45] Date of Patent: Dec. 5, 1995

[54] COMPONENT FOR INSTALLATION IN A PROCESS CONTROL APPARATUS

[75] Inventors: Arno Mattejat, Bubenreuth; Karl Strasser, Erlangen; Rainer Sahler, Cologne, all of Germany

[73] Assignee: Siemens Aktiengesellschaft, Munich, Germany

[21] Appl. No.: 135,257

[22] Filed: Oct. 12, 1993

[30]     Foreign Application Priority Data

Oct. 9, 1992 [DE]   Germany ................ 42 34 093.4

[51] Int. Cl.⁶ ........................... H01M 2/08; H01M 2/14
[52] U.S. Cl. ........................... 429/39; 429/35; 429/38
[58] Field of Search .................... 429/35, 38, 39

[56]              References Cited

U.S. PATENT DOCUMENTS

| | | |
|---|---|---|
| 3,615,852 | 10/1971 | Gehring . |
| 3,846,176 | 11/1974 | Kühl . |
| 4,317,864 | 3/1982 | Strasser ........................... 429/38 |
| 4,543,303 | 9/1985 | Dantowitz et al. ................ 429/39 |
| 4,649,091 | 3/1987 | Elroy . |
| 4,678,724 | 7/1987 | Elroy . |
| 5,232,792 | 8/1993 | Reznikov ........................... 429/35 |

FOREIGN PATENT DOCUMENTS

| | | |
|---|---|---|
| 0425939 | 5/1991 | European Pat. Off. . |
| 1806794 | 8/1970 | Germany . |
| 1902392 | 10/1970 | Germany . |
| 2729640 | 1/1979 | Germany . |
| 3323491 | 1/1984 | Germany . |
| 3935722 | 5/1991 | Germany . |
| 4033708 | 5/1991 | Germany . |
| 4009138 | 9/1991 | Germany . |
| 4030904 | 4/1992 | Germany . |
| 4030905 | 4/1992 | Germany . |
| 294383 | 1/1971 | U.S.S.R. . |
| 654395 | 7/1951 | United Kingdom . |

OTHER PUBLICATIONS

VDI–Reports–No. 912, 1992 no month available pp. 130–133.
Fuell Cell Handbook, 1989 no month available by Van Nostrand Reinhold New York.
Japanese Patent Abstract No. 62–163264 (Hotta), dated Jul. 20, 1987.
Japanese Patent Abstract No. 62–278758 (Motoo), dated Dec. 3, 1987.
Japanese Patent Abstract No. 4267062 (Isao), dated Sep. 22, 1992.

Primary Examiner—Wayne Langel
Attorney, Agent, or Firm—Herbert L. Lerner; Laurence A. Greenberg

[57]                ABSTRACT

A component for installation in a process control apparatus, such as a fuel cell block, includes two mutually parallel plates having inner surfaces facing toward each other and outer surfaces facing away from each other. Generally flat components resting on the outer surfaces of the plates define a first chamber with one of the outer surfaces and a second chamber with the other of the outer surfaces at two sides of the component. The inner surfaces of the plates enclose a third gas-tight chamber therebetween. At least one gas-tight channel extends between the plates in the plane of the plates. The at least one gas-tight channel has an inlet end communicating with an antechamber and a discharge end to be connected to at least one of the first, second and third chambers as needed.

12 Claims, 5 Drawing Sheets

COMPONENT FOR INSTALLATION IN A PROCESS CONTROL APPARATUS

BACKGROUND OF THE INVENTION

Field of the Invention

The invention relates to a component for installation in a process control apparatus, which can be inserted into a fuel cell block, for instance. The component includes two plates disposed parallel to one another. By way of example, process control equipment may also be an electrochemical cell, a mass transfer apparatus, a humidifier, or a condenser.

A fuel cell generally includes an electrically conductive current transmission plate, a cathode, an ion-conducting intermediate layer, an anode, and a further electrically conductive current transmission plate, which are stacked on one another in succession in the form of flat plates and form an electrolyte-electrode unit.

Fuel cells of such construction are known, among other sources from the "Fuel Cell Handbook" by Appelby and Foulkes, New York, 1989; from an article by K. Strasser entitled "Brennstoffzellen für Elektrotraktion" [Fuel Cells for Electrotraction], in VDI-Berichte No. 912, 1992, pp. 125–145; and from German Published, Prosecuted Application DE-AS 27 29 640, corresponding to U.S. Pat. No. 4,317,864. Since the fuel cell can convert chemically bound energy directly into electrical energy, it makes it possible for fuel, such as hydrogen, natural gas, or biogas, to be converted into electrical energy with greater efficiency and less environmental pollution than was possible with previously known conventional internal combustion engines that have an efficiency which is limited by what is known as the Carnot process.

A fuel cell block is made up of alternatingly stacked electrolyte-electrode units, gas chambers, cooling units and pressure cushions.

Seals and possibly spacers are built in between the individual units. The various liquid and gas chambers of a fuel cell block are supplied from axial channels through channels that extend in the plane of the plate through the seals. The axial channels extend at right angles to the plane of the stacked plate-like components of the fuel cell block.

A channel formed by putting together two intermediate layers that have grooves extending in the plane of the plate, was previously used to supply a liquid or gas chamber. The grooves require support in the area of the seals. The function of a component formed of two intermediate layers was defined by the disposition of the grooves even before the intermediate layers were made. It is therefore a disadvantage of such a component that it is impossible to use the component for a different task, that is for supplying a different liquid or gas chamber. Fuel cells with that type of component are known, for instance from German Published, Prosecuted Application DE-AS 19 30 116 and German Published, Prosecuted Application DE-AS 27 29 640, corresponding to U.S. Pat. No. 4,317,864. Moreover, a further disadvantage of those components formed of two intermediate layers is that for construction reasons, they are so thick that for many reasons it is disadvantageous to use them in a block of PEM fuel cells, for instance.

Summary of the Invention

It is accordingly an object of the invention to provide a component for installation in a process control apparatus, which overcomes the hereinafore-mentioned disadvantages of the heretofore-known devices of this general type, which is formed of two intermediate layers and which enables supply to and removal from both a chamber between intermediate layers and chambers located above and below it, through grooves extending in a plane of plates. For the sake of adaptation to various functions (gas supply, liquid supply), the component should be easy to modify both before and during the construction of a fuel cell block, for instance. Using such a component should produce a process control apparatus, such as a fuel cell block, that is distinguished by a low production price, high operational reliability, and especially simplicity of construction.

With the foregoing and other objects in view there is provided, in accordance with the invention, a component for installation in a process control apparatus, such as a fuel cell block, comprising two mutually parallel plates having inner surfaces facing toward each other and outer surfaces facing away from each other; generally flat components resting on both sides of the outer surfaces of the plates in the apparatus and defining a first chamber with one of the outer surfaces and a second chamber with the other of the outer surfaces at two sides of the component; the inner surfaces of the plates enclosing a third gas-tight chamber therebetween; an arbitrary antechamber; and at least one gas-tight channel extending between the plates in the plane of the plates, the at least one gas-tight channel having an inlet end communicating with the antechamber and a discharge end to be connected to at least one of the first, second and third chambers as needed.

As a result it is possible to supply at least one of the three chambers mentioned above with the incoming medium flowing into the antechamber, or to remove the medium located in at least one of the three chambers, from it.

In accordance with another feature of the invention, in a stack configuration of plate-like components of the apparatus, the antechamber is an axial channel being formed by openings in the plate-like components and extending at right angles to the plane of the plates. This means in particular that with three existing axial channels and with the corresponding channels extending in the plane of the plates, it is possible for each of the three aforementioned chambers to be acted upon by different media.

In accordance with a further feature of the invention, a plurality of axial channels are provided in the peripheral region of the stack configuration. As a result it is possible to provide the supply of various media to the various components of the process control apparatus, for instance the fuel cell block, through the axial channels in the outer region of the stack configuration, or in other words in the outer region of the plates of the component as well. As a result, the inner region may be used for holding an anode or cathode, for instance, or an electrolyte, each of which is in the form of flat layers, which have a square outline, for instance.

It is especially appropriate if the axial channels are closable in gas-tight fashion relative to one another. This means that by means of a seal, for instance, gas-tight sealing of the axial channels with respect to one another is attained, and that an incoming medium flowing in an axial channel can be supplied to one of the three aforementioned chambers only through at least one channel extending in the plane of the plates. In the final analysis, this is also the prerequisite for enabling the component of the invention to be disposed at various locations within a stack configuration of fuel cells, or in other words within a fuel cell block. In this way, for instance, it is possible to place one anode and one cathode parallel to the plane of the plates between two components according to the invention, with an electrolyte that conducts oxygen ions, protons or hydroxide ions being located between the anode and the cathode. As a result, in the immediate surroundings of the electrolyte-electrode unit, the components according to the invention are suitable for supplying the gases to the anode or cathode gas chamber and for supplying and removing a coolant, as well as for forming a pressure cushion.

It is also possible for a humidifier membrane, a gas chamber, and a further humidifier membrane to be disposed in succession between two components according to the invention, parallel to the plane of the plates. This advantageously makes it possible to use the components according to the invention inside a fuel cell block as a component of a gas humidifier unit.

In order to achieve especially high operational reliability of the process control apparatus in the course of supplying and removing liquid or gaseous media, the component may have one or more of the following properties:

a) The two plates of the component are welded together at their edges for the sake of gas-tight sealing of the third chamber;

b) The two plates of the component are welded together in gas-tight fashion around the openings formed in the wall region;

c) The channels extending in the plane of the plates, for supplying the first or second chamber, are opened inside the weld seam encompassing the openings toward the desired first or second chamber, by drilling open the plate defining the corresponding chamber; or d) The gas-tight channel extending in the plane of the plates for supplying the third chamber between the two plates is not included in the peripheral welding of the opening associated with it.

It is especially the properties given above in paragraphs c) and d) that also assure the easy modification of the component for supplying at least one of the three aforementioned chambers. Moreover, this means that even when a process control apparatus is being constructed, the component can easily be adapted to the intended use.

In accordance with an added feature of the invention, the plates have peripheries being welded together to gas-tightly seal the third chamber.

In accordance with an additional feature of the invention, the plates are gas-tightly welded together around the openings formed in the peripheral region.

In accordance with yet another feature of the invention, the gas-tight channels extending in the plane of the plates are selectively drilled open through one of the plates defining one of the first and second chambers, for supplying one of the first and second chambers inside the weld seam enclosing the openings.

In accordance with yet a further feature of the invention, one of the gas-tight channels extending in the plane of the plates for supplying the third chamber between the plates, is not included in the peripheral welding of one of the openings associated with it.

In accordance with yet an added feature of the invention, there are provided seals gas-tightly sealing the axial channels from one another.

In accordance with yet an additional feature of the invention, the plates have a structure defining the third chamber disposed between the plates.

In accordance with again another feature of the invention, the plates have frustoconical protuberances defining a mutual spacing thereof, the protuberances have center points defining an outline of an equilateral triangle, the structure of the plates resting directly on one another is staggered by approximately half a spacing of adjacent truncated cones, and a shortest radius of the frustoconical protuberance is greater than half a radius of a circle circumscribing the equilateral triangle.

In accordance with a concomitant feature of the invention, the plates are formed of a nonrusting metal material.

Other features which are considered as characteristic for the invention are set forth in the appended claims.

Although the invention is illustrated and described herein as embodied in a component for installation in a process control apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
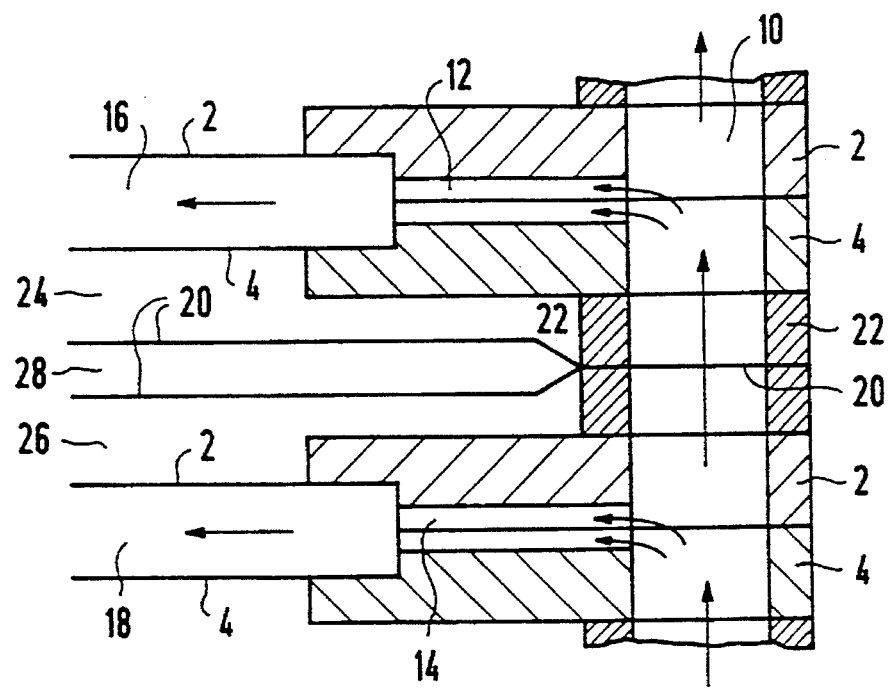
FIG. 1 is a fragmentary, diagrammatic, cross-sectional view of a stack configuration of intermediate layers of a fuel cell in accordance with the prior art (German Published, Prosecuted Application DE-AS 21 29 187, corresponding to U.S. Pat. No. 3,979,224)

Referring now to the figures of the drawing in detail and first, particularly, to FIG. 1 thereof, there is seen a portion of a section through a stack configuration of intermediate layers 2, 4 of a fuel cell block, with two radial channels 12, 14 being disposed at right angles to an axial channel 10. Chambers 16, 18 that are respectively located between the intermediate layers 2, 4 are supplied through the radial channels 12, 14. A further component 20 which may, for instance, be used to receive a non-illustrated coolant or pressure gas (pressure cushion), is built in between the intermediate layer 4 and the intermediate layer 2 and is spaced apart from and sealed off from the intermediate layers 2, 4 by means of seals 22. The configuration shown in FIG. 1 is suitable only for supplying the chambers 16, 18 with a liquid or gaseous medium. It is not possible with that configuration to supply chambers 24, 26, 28 located above, below and between parts of the component 20.

Figure 2:
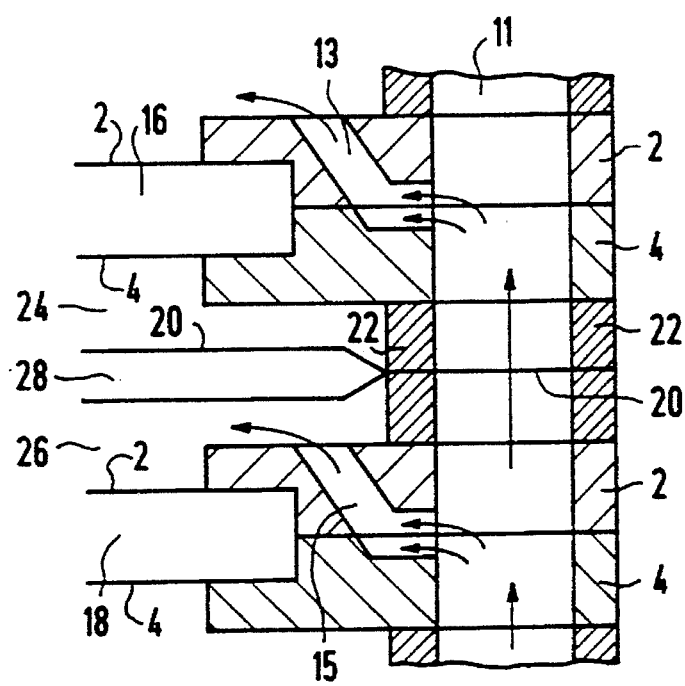
FIG. 2 is a different fragmentary, cross-sectional view of a stack configuration of intermediate layers of the fuel cell of FIG. 1 in accordance with the prior art (German Published, Prosecuted Application DE-AS 21 29 187, corresponding to U.S. Pat. No. 3,979,224)

In order to enable a liquid or gaseous medium, for instance, to be supplied to the chamber 26 below the component 20, the intermediate layers 2, 4 must be constructed differently from that shown in FIG. 1 and be used in a structure that is otherwise unchanged from FIG. 1. Such a further structure is represented in FIG. 2 by radial channels 13, 15. In order to supply the four recurrent chambers 16, 24, 26, 28 along a stack configuration made up of intermediate layers 2, 4, seals 22 and components 20 of a fuel cell block which is not illustrated in further detail herein, it is therefore necessary, beyond the fragmentary views of the intermediate layers 2, 4 shown in FIGS. 1 and 2, to provide even more radial channels in the intermediate layers 2, 4, by way of which the chambers 24, 28 can also be supplied with a liquid or gaseous medium, that flows in through further corresponding axial channels.

Constructing the radial channels 12–15 in accordance with FIGS. 1 and 2 is possible only whenever the fuel cell has an electrolyte chamber of relatively great thickness (approximately 1.8 mm) and thick electrodes (approximately 1 mm). If the electrolyte includes only a membrane (approximately 0.2 mm) or an electrolyte matrix (approximately 0.2 mm), and if only thin electrodes (<0.1 mm) are used, then the intermediate layers 2, 4 become superfluous. In that case the seal 22 seals directly at the membrane electrolyte, the electrolyte matrix or a thin frame in which the electrolyte matrix is tightly installed, but has a thickness that is not enough to make radial channels 12–15 as in FIGS. 1 and 2. In that case, the radial channels 12–15 must be integrated into the seal 22 or into the components 20. Any other form increases the expense for expensive materials and the internal resistance of the fuel cell block, it increases the production cost, and it results in additional weight and volume.

Figure 3:
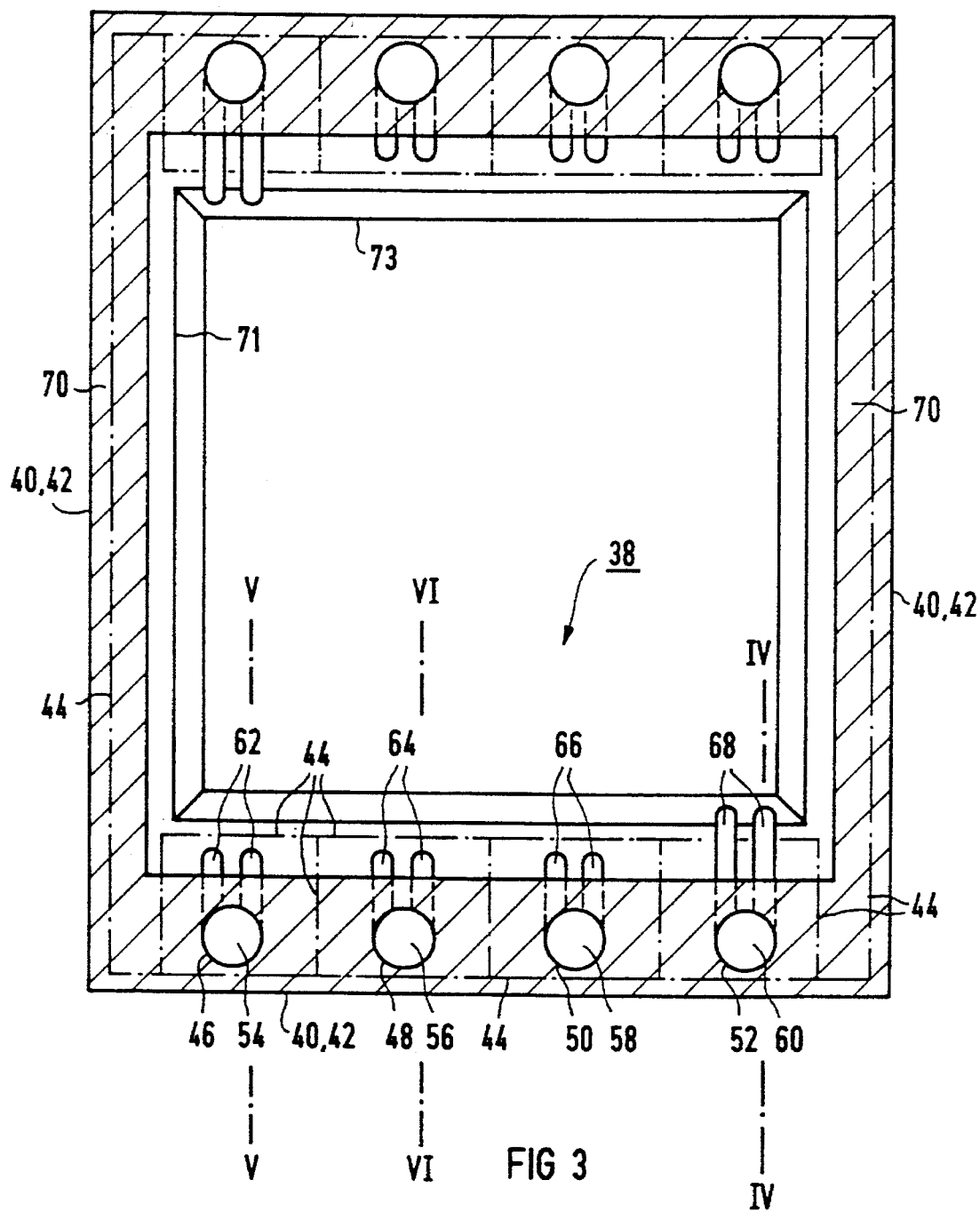
FIG. 3 is a plan view of a component according to the invention.

The plan view of FIG. 3 shows a component 38 according to the invention, which includes two plates 40, 42 disposed parallel to one another. The plates 40, 42 are joined to one another by means of a gas-tight weld seam 44 (which is suggested by dot-dashed lines). Through the use of the weld seam 44, a flat, block-shaped, structured chamber, with an outline that is square and is described by lines 71, 73 in the exemplary embodiment, is enclosed in gas-tight fashion between the plates 40, 42. The plates 40, 42 are constructed in such a way that protuberances of the plates 40, 42, which are shown in further detail in FIGS. 4-6, rest against the axial flow line. This structure at the same time assures permeability to liquid and gaseous media in the radial direction (in the plane of the plates) between the plates 40, 42.

Openings 46–52, which form part of axial channels 54–60, are provided in the plates 40, 42. Each of the axial channels 54–60 is adjoined by two channels 62–68 extending in the plane of the plates. The channels 62–68 are created by joining together the plates 40, 42, which have half-round, groove-like indentations impressed into them in coincident fashion. The channels 62, 64, 66 are initially constructed identically, and then depending on the chamber to be supplied, they are opened at the top or at the bottom. Only the channels 68 are made longer than the channels 62–66 and are initially intended for supplying the chamber between the plates 40, 42. However, the channels 68 could perform the same function as the channels 62–66, if the weld seam 44 were to be made at right angles to the channels 68, as is the case for the channels 62–66.

Figure 4:
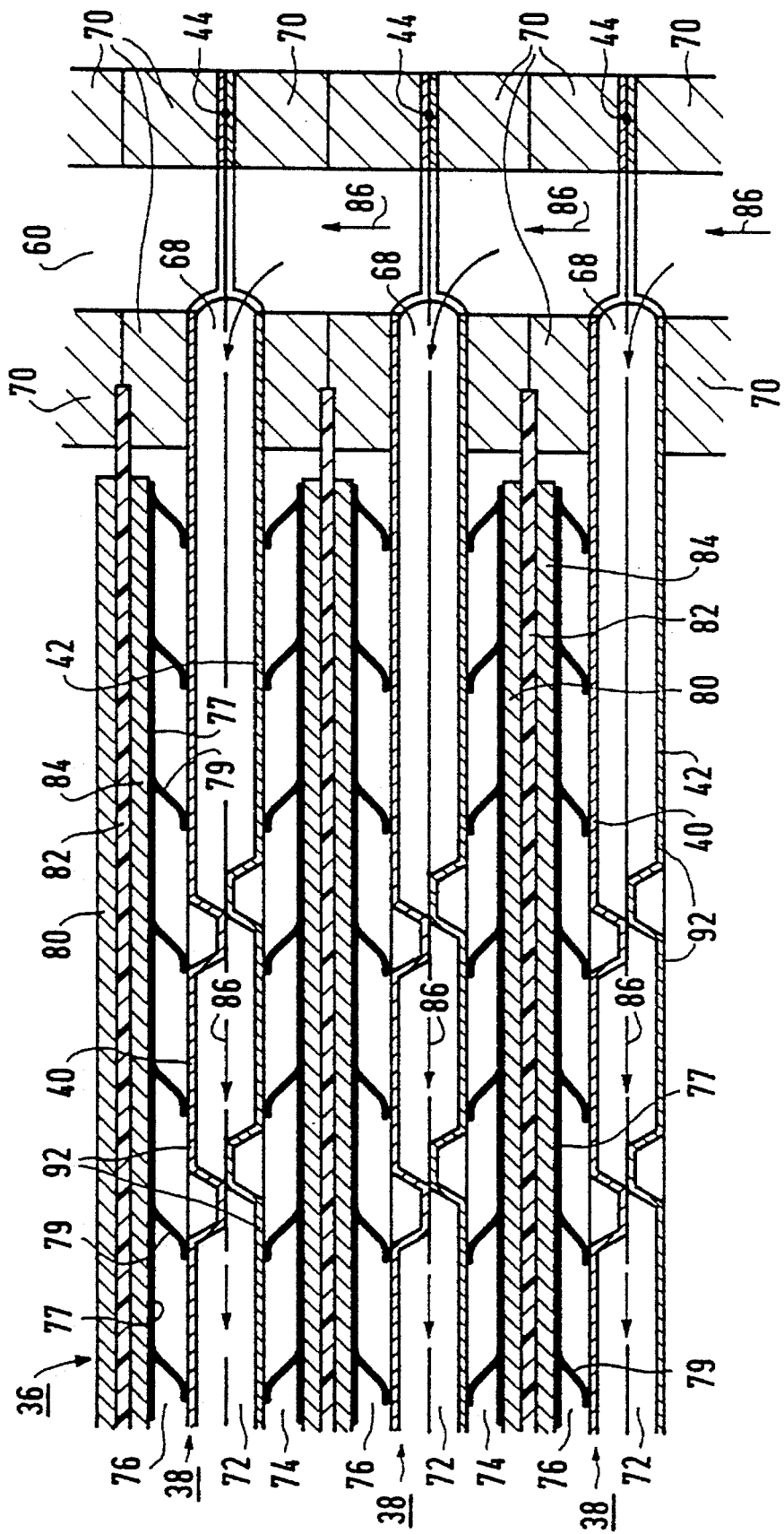
FIG. 4 is a fragmentary, cross-sectional view of a fuel cell block taken along a line IV—IV of FIG. 3, with three components according to the invention.
Figure 5:
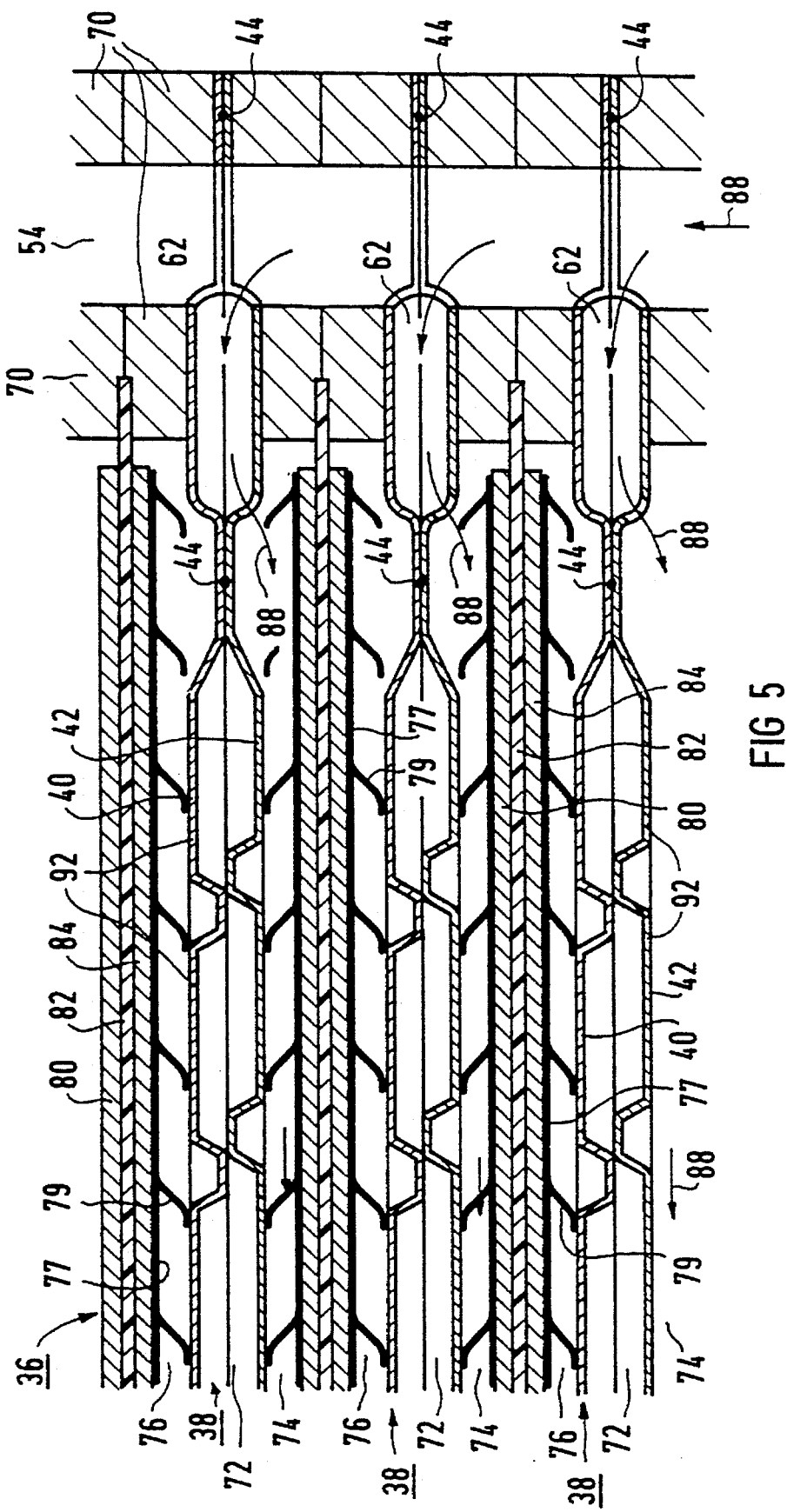
FIG. 5 is a different fragmentary, cross-sectional view of the fuel cell block taken along a line V—V of FIG. 3, with three components according to the invention.
Figure 6:
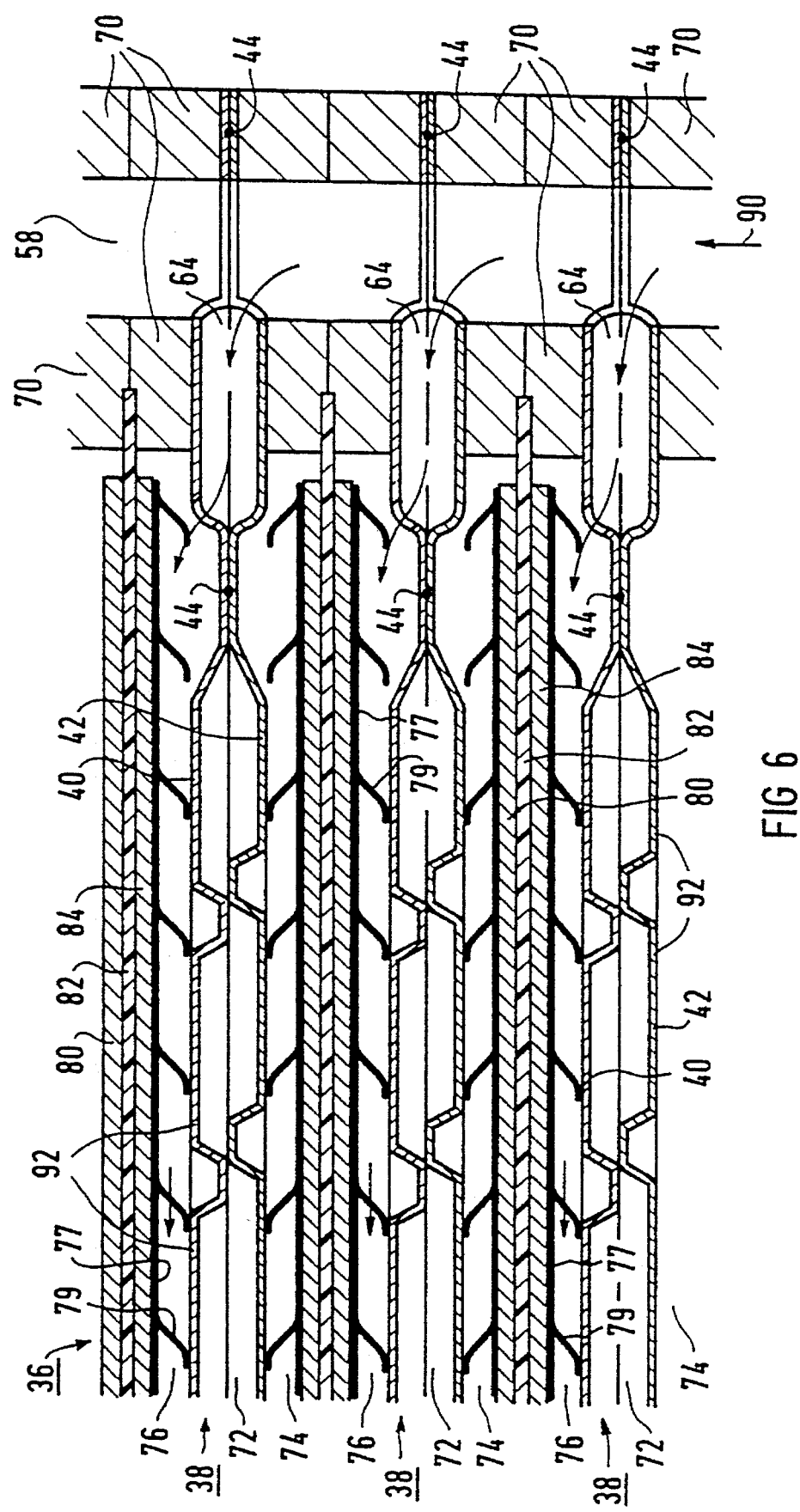
FIG. 6 is a further fragmentary, cross-sectional view of the fuel cell block taken along a line VI—VI of FIG. 3, with three components according to the invention.

The shading in FIG. 3 indicates a seal 70, which is located above and below the plates 40, 42, that seals off the axial channels 54–60 from one another and which also seals off the chamber above and the chamber below the plates 40, 42 from its surroundings toward the sides. The seal 70 is formed of an elastomer, for example, and in the exemplary embodiment it has a thickness of approximately 3 mm. The chamber above and the chamber below the plates 40, 42 is bounded entirely by stacking a further component 38 or a further function unit onto the seal 70. This may, for instance, be an electrolyte-electrode unit that is shown in FIGS. 4-6 as a function unit, into which a contact plate 77, a plate of carbon paper, an anode 80, a polymer electrolyte membrane (PEM) 82, a cathode 84, a further plate of carbon paper, and a further contact plate 77 are installed in succession.

The chamber below the component 38 could, for instance, be sealed off by a non-illustrated function element, which has a humidifier membrane, a gas chamber, and a further humidifier membrane, in succession. In the exemplary embodiment shown in FIG. 3, the supply of the chamber below the plates 40, 42 of the component 38 is provided through the axial channel 54 and the channels 62. In the assumed case of a humidifier membrane adjoining the underside of the plates 40, 42 of the component 38, this chamber is acted upon by water, in order to humidify the gas flowing through the gas chamber disposed below the humidifier membrane. In the exemplary embodiment assumed herein, this gas is a hydrogen gas.

The humidified hydrogen gas may then be introduced through the axial channel 56 and the channels 64, for instance, into the chamber above the plates 40, 42 and therefore supplied to an anode that is assumed to be disposed above it in the exemplary embodiment. The chamber between the plates 40, 42 is acted upon by coolant through the axial channel 60 and the channels 68, in the exemplary embodiment. Oxygen flows through the axial channel 58, in the exemplary embodiment. Since none of the chambers to be supplied by means of the component 38 needs to be acted upon by oxygen gas in the case assumed, the channels 66 are peripherally welded and are drilled through neither the upper plate 40 nor the lower plate 42 and therefore are opened.

The point-symmetrical construction of the component 38 makes it possible for the media supplied through the axial channels 54, 56, 60 and the radial channels 62, 64, 68 to be removed again by mirror-image channels on the opposite side of the component 38 (which are at the top in the view shown in FIG. 3). The mirror-image channels are disposed in such a way that the media describe an essentially diagonal flow in the plane of the plates.

FIGS. 4–6 show details of various sections taken in the axial direction through a fuel cell block 36 having a plurality of components 38 according to the invention.

The fragmentary view shown in FIG. 4 is a section through the fuel cell block 36 taken along the line IV—IV of FIG. 3. In contrast to the plan view of the component 38 according to the invention which is shown in FIG. 3, in this case the seals 70 are shown in section. The electrolyte-electrode units which are installed between each two components 38 each include, in succession, one contact plate 77 with stamped-out contact tongues 79, an anode 80, a PEM 82, and a cathode 84, and a further contact plate 77. On the side facing away from the PEM 82, the anode 80 and the cathode 84 each have a layer of carbon paper, but it is not shown in further detail therein.

Coolant 86 flowing in through the axial channel or antechamber 60 flows through an inlet end of the channels 68, through the channels 68, out a discharge end of the channels 68, into chambers 72 that are enclosed in gas-tight and water-tight fashion by the plates 40, 42. Reference numerals 76 and 74 indicate first and second chambers that are respectively located above and below the plates 40, 42, with the chamber 72 being a third chamber. Inner surfaces of the plates 40, 42 enclose the third chamber 72 and the generally flat components 80, 84 define the first and second channels 76, 74 along with outer surfaces of the plates 40, 42.

FIG. 5 shows a section of a fuel cell block 36 taken along the line V—V of FIG. 3. Hydrogen gas (H$_2$) 88 flows through the axial channel or antechamber 54 and on into an inlet end of the channels 62, through the channels 62 and out a discharge end of the channels 62 into the chambers 74 located below the plates 42. Toward the bottom, each of the chambers 74 are defined by the anode 80 and the PEM 82 respectively adjoining them in the axial direction after the contact plate 77. The chambers 72 enclosed by the plates 40, 42 are sealed in gas-tight fashion from the channels 62 by the weld seams 44. Opening of the channels 62 to the chambers 74 is accomplished by simply drilling open the plates 42.

FIG. 6 is a section through the fuel cell block 36 which is taken along the line VI—VI of FIG. 3. Oxygen gas (O$_2$) 90 flows through the axial channel or antechamber 58, into the inlet end of the channels 64, through the radial channels 64 and out the discharge end of the channels 64 into the channels 76 located above the plates 40. The chambers 76 are each closed by the respective adjoining cathode 84 and the membrane electrolyte (PEM) 82 following the contact plate 77. Opening of the channels 64 to the chambers 76 is performed in this case by simply drilling open the plates 40.

It is thus possible in a simple way, by means of the component 38, to make any arbitrary axial channel 54–60 discharge selectively through the channels 62–68 into one of the three chambers 72, 74, 76. In order to supply the chamber 72, the radial channel 68 need not be modified. In order to supply the chambers 74 and 76, the channels, which are encompassed by the weld seams 44, should be opened in the plate 42 and in the plate 40 in accordance with FIGS. 5 and 6. The plates 40, 42 and the weld seam 44 are constructed to withstand the pressures prevailing in the various liquid and gas chambers during operation of a fuel cell block 38. These pressures are a hydrogen pressure of 2.0 bar and an oxygen pressure of 2.3 bar, for instance.

In order to space apart the plates 40, 42, it is possible, as an alternative to hemispherical protuberances, to provide half-round groove-like protuberances or frustoconical protuberances 92 in the plates 40, 42, having structures which are staggered with respect to one another. The hemispherical or half-round groove-like or frustoconical protuberances 92 then define the volume and structure of the chamber 72 enclosed by the plates 40, 42.

In order to use the component 38 in a process control apparatus with a compact stack configuration of individual components, an especially advantageous embodiment of the protuberances of the plates 40, 42 of the component 38 is obtained if the plates 40, 42 have frustoconical protuberances 92 that define their mutual spacing. Center points of these protuberances define the outline of an equilateral triangle. These equilateral triangles are staggered relative to one another on immediately adjacent plates 40, 42 by approximately half the spacing between adjacent frustoconical protuberances 92. The shortest radius of the frustoconical protuberance is greater than half the radius of a circle that circumscribes the equilateral triangle. As a result, a truncated cone of the plate 40, for instance, is disposed concentrically with the equilateral triangle that is formed of three truncated cones of the plate 42 and at the same time rests on the three truncated cones. This reliably precludes the protuberances of adjacent plates 40, 42 from sliding into one another.

In the embodiments shown in FIGS. 3–6, the component 38 according to the invention may be provided not only as a fuel cell block but also in process control apparatuses, such as electrochemical cells, mass transfer equipment, humidifiers and condensers.

We claim:

1. A component for installation in a process control apparatus, comprising:

two mutually parallel plates having inner surfaces facing toward each other and outer surfaces facing away from each other;

generally flat components resting on said outer surfaces of said plates and defining a first chamber with one of said outer surfaces and a second chamber with the other of said outer surfaces at two sides of the component;

said inner surfaces of said plates enclosing a third gas-tight and water-tight chamber therebetween;

an antechamber; and at least one gas-tight channel extending between said plates in the plane of said plates, said at least one gas-tight channel having an inlet end communicating with said antechamber and a discharge end to be connected to at least one of said first, second and third chambers as needed.

2. The component according to claim 1, wherein said plates are plate-like components in a stack configuration, and said antechamber is an axial channel being formed by openings in said plate-like components and extending at right angles to the plane of said plates.

3. The component according to claim 2, wherein said stack configuration has a peripheral region in which said axial channel and at least one other axial channel are formed as a plurality of axial channels.

4. The component according to claim 3, wherein said plates have peripheries being welded together to gas-tightly seal said third chamber.

5. The component according to claim 4, wherein said plates are gas-tightly welded together around said openings formed in said peripheral region.

6. The component according to claim 5, wherein said gas-tight channels extending in the plane of said plates are selectively drilled open through one of said plates defining one of said first and second chambers, for supplying one of said first and second chambers inside said weld seam enclosing said openings.

7. The component according to claim 5, wherein one of said gas-tight channels extending in the plane of said plates for supplying said third chamber between said plates, is not included in the peripheral welding of one of said openings associated with it.

8. The component according to claim 3, including seals gas-tightly sealing said axial channels from one another.

9. The component according to claim 1, wherein said plates have a structure defining said third chamber disposed between said plates.

10. The component according to claim 9, wherein said plates have frustoconical protuberances defining a mutual spacing thereof, said protuberances have center points defining an outline of an equilateral triangle, said structure of said plates resting directly on one another is staggered by approximately half a spacing of adjacent truncated cones, and a shortest radius of said frustoconical protuberance is greater than half a radius of a circle circumscribing said equilateral triangle.

11. The component according to claim 1, wherein said plates are formed of a nonrusting metal material.

12. The component according to claim 1, wherein said discharge end of said gas-tight channel is connected only to one of said first, second and third chambers.

\* \* \* \* \*